US012735357B2

(12) United States Patent
Chen et al.

(10) Patent No.: US 12,735,357 B2
(45) Date of Patent: Sep. 15, 2026

(54) BASALT FIBER REINFORCED ASPHALT CONCRETE

(71) Applicants: National Central University, Taoyuan City (TW); UAN TAN CO., LTD., Taoyuan City (TW)

(72) Inventors: Jieh-Haur Chen, Taoyuan City (TW); Yu-Min Su, Taoyuan City (TW); Min-Chih Liao, Taoyuan City (TW); Yen-Yu Lin, Taoyuan City (TW); Cheng-Ching Peng, Taoyuan City (TW)

(73) Assignees: National Central University, Taoyuan City (TW); UAN TAN CO., LTD., Taoyuan City (TW)

( * ) Notice: Subject to any disclaimer, the term of this patent is extended or adjusted under 35 U.S.C. 154(b) by 418 days.

(21) Appl. No.: 18/377,377

(22) Filed: Oct. 6, 2023

(65) Prior Publication Data

US 2025/0034043 A1 Jan. 30, 2025

(30) Foreign Application Priority Data

Jul. 28, 2023 (TW) ................................ 112128486

(51) Int. Cl.
*C04B 26/26* (2006.01)
*C04B 14/46* (2006.01)
*C04B 111/00* (2006.01)

(52) U.S. Cl.
CPC .......... *C04B 26/26* (2013.01); *C04B 14/4643* (2013.01); *C04B 2111/0075* (2013.01)

(58) Field of Classification Search
CPC ................ C04B 26/26; C04B 14/4643; C04B 2111/0075
See application file for complete search history.

(56) References Cited

U.S. PATENT DOCUMENTS

2020/0048466 A1* 2/2020 McDade .................. E01C 7/18

OTHER PUBLICATIONS

Yuanxun et al. Fatigue Property of basalt fiber-modified asphalt mixture under complicated environment, Journal of Wuhan University of Technology-Mater. Sci. Ed. pp. 996-1004 (Year: 2014).*
Radziszewski et al. Properties of asphalt concrete with basalt-polymer fibers. Archives of Civil Engineering, vol. LXIV, pp. 197-209 (Year: 2018).*
Bitumen AH-70 product specification retrieved from https://infinitygalaxy.org/product/bitumen-ah70/ on Dec. 19, 2025 (Year: 2025).*

* cited by examiner

*Primary Examiner* — Amber R Orlando
*Assistant Examiner* — Anastasia A. Kuvayskaya
(74) *Attorney, Agent, or Firm* — Demian K. Jackson; Jackson IPG PLLC

(57) ABSTRACT

The present invention relates to a basalt fiber reinforced asphalt concrete, which includes: an asphalt material with a penetration grade between 40-300 at room temperature, selected from one of an asphalt mortar, an oil-soluble asphalt, an emulsified asphalt, and a modified asphalt; an aggregate having a first volume percentage between 50-80%; a basalt fiber reinforcement with a second volume percentage between 0.1-0.9%; and a chemical admixture for asphalt concrete used to adjust the properties of the basalt fiber reinforced asphalt concrete.

6 Claims, 3 Drawing Sheets

BASALT FIBER REINFORCED ASPHALT CONCRETE

CROSS-REFERENCE TO RELATED APPLICATION

This application claims priority benefit to Taiwan Invention patent application No. 112128486, filed on Jul. 28, 2023, in Taiwan Intellectual Property Office, the entire disclosures of which are incorporated by reference herein.

FIELD

The present invention relates to a basalt fiber reinforced asphalt concrete, in particular to a basalt fiber reinforced asphalt concrete with enhanced tensile strength and toughness by adding basalt fiber reinforcements.

BACKGROUND

In the conventional technologies, asphalt concrete (AC) is made by mixing asphalt mortar, which has a viscous asphalt binder, with aggregates of different particle sizes as well as sands and fillers in specific proportions, according to the mix design methods for asphalt concrete. It is mainly used as the surface pavement for flexible roads. In Taiwan, AC materials have become the mainstream materials used for road pavement, especially polymer modified asphalt and stone matrix asphalt concrete, which have been widely used by the National Freeway Bureau in the construction, maintenance and reconstruction of national highways, and have been used to cope with the heavy traffic volume on national highways for over 20 years.

However, as the pavement, due to the increasing heavy traffic flow, the pavement bears a large amount of repetitive grinding pressure, as well as the cold shrinkage and thermal expansion effects caused by environmental factors such as climate and rainfall.

In addition, AC materials originally lack tensile strength and toughness, and the adhesive strength and tensile strength of AC materials also decrease year by year. Therefore, after years of use, the surface layer of AC pavement will inevitably develop multiple reflective cracks, rutting deformation, and fatigue cracks along the wheel paths in both transverse and longitudinal directions. Although asphalt sealants are often used to repair them, the repair results are usually limited.

In particular, in recent years, global warming has led to frequent extreme temperatures, extreme rainfall, and earthquake events, exacerbating environmental factors. According to statistics from the U.S. Federal Highway Administration, about 36% of flexible road surfaces and 24% of rigid road surfaces are damaged due to these extreme environmental factors.

In view of the above factors, various engineering designs, including infrastructure engineering, have begun highly requiring excellent toughness performance of asphalt concrete to cope with the harsh usage environments in the future. Therefore, for the design of asphalt concrete materials, it is necessary to incorporate more toughness design considerations to enhance the tensile strength of asphalt concrete. The research and development of high-toughness asphalt concrete has become an urgent task.

In view of the deficiencies/issues in the conventional technologies, there is a need to solve the above deficiencies/issues. Hence, the inventor has come up with the present invention of "Basalt Fiber Reinforced Asphalt Concrete" after painstaking trials, research and perseverance to overcome the aforementioned deficiencies. The brief description of the present invention is disclosed as follows.

SUMMARY

The present invention relates to a basalt fiber reinforced asphalt concrete, in particular to a basalt fiber reinforced asphalt concrete with enhanced tensile strength and toughness by adding basalt fiber reinforcements.

The present invention provides a basalt fiber reinforced asphalt concrete. The basalt fiber reinforced asphalt concrete includes an asphalt material with a penetration grade between 40-300 at room temperature, selected from one of an asphalt mortar, an oil-soluble asphalt, an emulsified asphalt, and a modified asphalt; an aggregate having a first volume percentage between 50-80%; a basalt fiber reinforcement with a second volume percentage between 0.1-0.9%; and a chemical admixture for asphalt concrete used to adjust the properties of the basalt fiber reinforced asphalt concrete.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
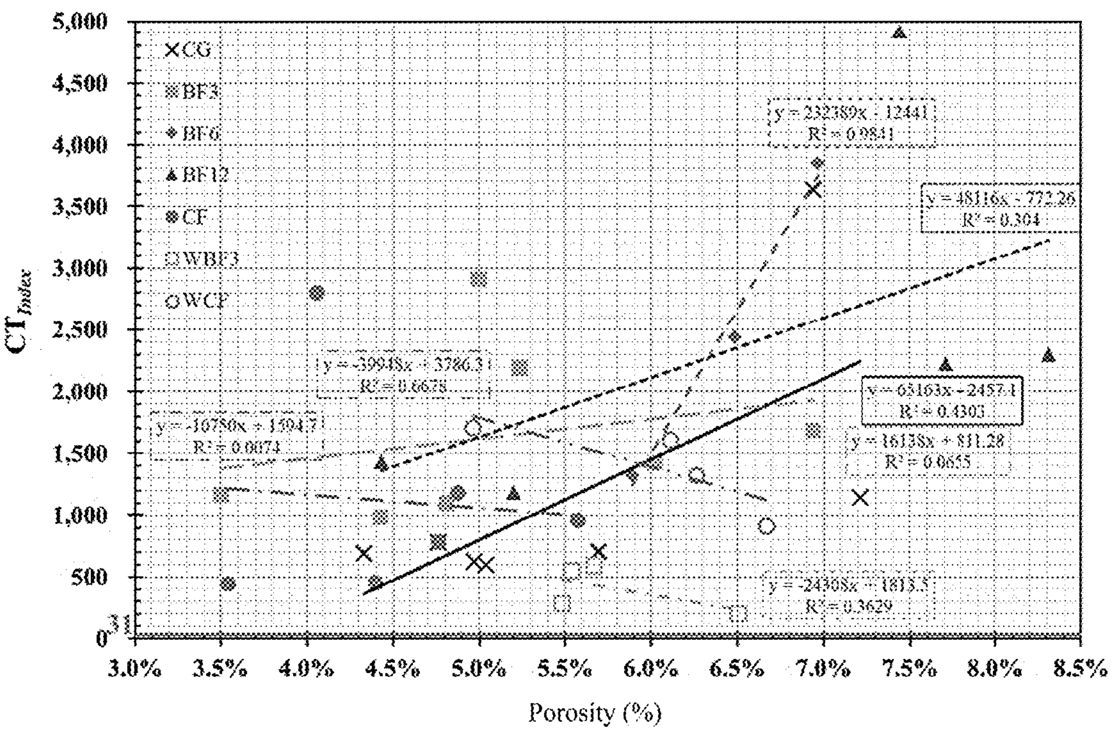
FIG. 1 is a graph illustrating the relationship between the porosity and the CT Index of the basalt fiber reinforced asphalt concrete according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including" used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The development of high-resilience asphalt concrete has become an important issue. The present invention provides adding basalt fiber reinforcement bars into the asphalt mortar as a reinforcing material to form basalt fiber reinforced asphalt concrete after solidification, so as to enhance the engineering mechanics performance and toughness properties thereof, and also discloses the optimal amount of basalt fiber reinforcement bars added as well as the toughness design performance of the asphalt concrete pavement structure after adding the basalt fiber reinforcement bars.

The present invention provides a type of basalt fiber reinforcement bars, primarily consisting of basalt fiber, which is a new type of composite material that is produced by first combining and mixing with polymer materials such as, but not limited to, synthetic resins, unsaturated polyesters, epoxy resins, or vinyl resins, along with fillers and curing agents and then performing an extrusion molding process.

Measurements indicate that the basalt fiber reinforcement bars provided in the present invention include physical properties as follows. The density of the basalt fiber reinforcement bars is in a range between 1.9 to 2.1 g/cm$^3$, which is only about ¼ of that of steel bars (given that the density of steel bars is 7.8 to 7.9). The tensile strength of the basalt fiber reinforcement bars is approximately 2 to 3 times that of steel bars. The thermal expansion coefficient of the basalt fiber reinforcement bars is very close to that of concrete, which ensures that the deformation between the basalt fiber reinforcement bars and the concrete is synchronous.

The basalt fiber reinforcement bars disclosed in the present invention are composite materials made of non-metallic materials, rendering them corrosion-resistant and electrically insulating, further with non-magnetic properties. The basalt fiber reinforcement bars also exhibit extremely high acid and alkali resistance, and have higher tolerance for moisture concentration and permeation and diffusion of carbon dioxide in asphalt mortar, preventing corrosion in harsh environments, thereby enhancing the durability for structure using the basalt fiber reinforcement bars.

Embodiment 1

(A) Formulation of composition materials:

(1) Asphalt material: It is preferable to use straight-run asphalt (bitumen) mortar with properties of AC-20 viscosity or 60/70 penetration grade provided by CPC Corporation or Formosa Plastics Corporation, which are currently widely used asphalt materials for various levels of highway pavement. Modified asphalt and stone matrix asphalt mortar use qualified materials that meet the highway paving standards.

The commonly used polymer modification material for modified asphalt is "styrene-butadiene-styrene" (SBS). This material is used for blending and producing polymer modified binder (PMB) to form the composition structure of dense-graded asphalt mixture (DGAC) as polymer-modified asphalt (PMA).

Furthermore, stone matrix asphalt (SMA) is selected for use. SMA is produced by using modified asphalt mortar, fiber stabilizers, or cementitious fillers. SMA possesses properties such as high durability, resistance to rutting deformation, and the ability to withstand studded tires.

(2) Coarse and fine aggregates: It is preferable to use 6 mm, 3 mm stone, and fine sand as the coarse and fine aggregate skeleton. The test specimen aggregate uses aggregates sourced from Pingtung Ligan Creek with a nominal maximum size of 19 mm and a gap-graded structure. Coarse aggregates are those retained on and above a 4.75 mm sieve.

(3) Basalt fiber reinforcement bars: It is preferable to use basalt fiber reinforcement bars with lengths in a range from 1 to 12 mm, which can be regarded as replacements for a part of fine aggregates. The basalt fibers used in the present invention are produced by melting basalt rock at high temperatures, followed by centrifugal spinning, cooling, and sizing, and have an average thickness about 13 μm and appear as brown fibrous strands. Additionally, 6 mm basalt fibers are mixed in as additional additives. Basalt's main component is 50% (wt %) silicon dioxide, which improves the high-temperature performance and fatigue resistance of asphalt concrete. It is also mixed with aluminum oxide, iron (III) oxide, iron oxide, calcium oxide, magnesium oxide, etc., to have good mechanical properties and chemical stability.

The basalt fibers used in the present invention have the composition as shown in the following table:

| Composition | Percentage by weight |
|---|---|
| $SiO_2$ | 50% |
| $Al_2O_3$ | 15% |
| $Fe_2O_3$ | 10% |
| FeO | 10% |
| CaO | 8% |
| MgO | 7% |
| $Na_2O$ | 2.5~6% |
| $K_2O$ | 1% |
| Others | 2~3.5% |

The basalt fibers used in the present invention have the physical properties as shown in the following table:

| Physical properties | |
|---|---|
| Tensile strength | 2500~3500 MPA |
| Modulus of elasticity | 90~110 GPA |
| Elongation rate | ≤3.2% |
| Water content | ≤0.1% |
| Melting point | 1600° C. |

(4) Mineral filler: The mineral filler used in the present invention is limestone powder, the main component of which is calcium carbonate, and it complies with ASTM D242/D242M requirements for mineral fillers. The requirements for mineral fillers are that they must not contain agglomerates, clay particles, or other organic or harmful substances, and pass through a 0.075 mm (No. 200 sieve), as specified in the table below:

| Sieve No. | Percentage by weight (%) passed |
|---|---|
| 1.18 mm (No. 16) | 100 |
| 0.60 mm (No. 30) | 97 to 100 |
| 0.30 mm (No. 50) | 95 to 100 |
| 0.075 mm (No. 200) | 70 o 100 |

(5) Chemical admixtures: Chemical admixtures for asphalt concrete refer to chemical agents added before or during the mixing of asphalt concrete, in addition to asphalt materials, aggregates, and basalt fiber reinforcement bars. These admixtures are used to adjust and alter the properties of freshly mixed asphalt concrete or solidified asphalt concrete, including workability, setting time, and solidification characteristics. The main purpose of adding a small amount of chemical admixtures is only to improve mixing efficiency and workability. It is generally believed that adding chemical admixtures cannot enhance the toughness for asphalt concrete.

(B) Marshall mix design for asphalt concrete, specimen production, and toughness design performance evaluation:

(1) Marshall mix design for asphalt concrete: A 19 mm dense-graded asphalt concrete is preferably selected according to Marshall mix design to determine the optimal asphalt content.

(2) Basalt fiber reinforcement bars with volume ratios of 0.1%, 0.2%, 0.3%, 0.4%, 0.5%, 0.6%, 0.7%, 0.8%, and 0.9%, respectively, are added to replace a part of fine aggregates. The optimal amount of basalt fiber reinforcement bars is determined through tests including Marshall stability, flow value, and indirect tension test.

(3) SBS-modified AC-20 polymer-modified asphalt is preferably selected to use as the base asphalt for fiber-reinforced asphalt mortar and stone matrix asphalt mortar. Then, 0.3% by weight of 3 mm basalt fiber and cellulose fiber are further added into the base asphalt for fiber-reinforced asphalt mortar. The mixture is processed at a mixing temperature of 180° C., a mixing rate of 1000 r.p.m., and a mixing time of 30 minutes to form the fiber-reinforced asphalt mortar.

(4) Relevant performance tests, including indirect tension and IDEAL-CT resistance to cracking tests, are conducted to evaluate the performance of the toughness design.

(5) At the same time, the modified asphalt is compared and its performance is evaluated against stone matrix asphalt concrete in accordance with the standards of the Highway Bureau.

Embodiment 2

In this embodiment, preferably basalt fiber reinforcement bars in volume percentages of 0.1%, 0.3%, 0.5%, 0.7%, 0.9%, 1.1%, and 1.3% are selected to be added to the asphalt concrete to form the direct tensile test (DTT) specimens that are subjected to direct tensile fatigue testing at −20° C. Measurements indicate that when the amount of basalt fiber reinforcement bars added does not exceed 0.7%, it can enhance the tensile strength of the final asphalt concrete specimen. The fatigue test results indicate that under the test conditions of 75% repetitive tensile strength to maximum tensile strength ratio, 1 Hz loading frequency and −20° C., the number of cycles increased from 18,440 cycles for pure mortar to 34,669 cycles for the basalt fiber reinforced state, representing a 91% increase. Furthermore, the strain at final failure decreased from 0.0227 to 0.0185, a reduction of 18.5%.

Embodiment 3

In this embodiment, preferably a dense-graded asphalt concrete with an oil content of 5.0% is selected, and basalt fiber reinforcement in volume percentages of 0%, 0.25%, 0.50%, 0.75%, 1.0%, 1.5%, and 2.0%, respectively, are selected to be added to the asphalt concrete. The performance is evaluated using Marshall effectiveness and ultrasonic wave velocity methods. Measurements indicate that for the dense-graded asphalt concrete with 5.0% oil content, the optimal addition ratio of basalt fiber reinforcement bars is 0.5%. As the proportion of added basalt fiber reinforcement bars increases, ultrasonic wave velocity and voids in mineral aggregate (VMA) also increase correspondingly, indicating better toughness.

Embodiment 4

In this embodiment, basalt fiber reinforcement bars in volume percentages of 0%, 0.2%, 0.3%, 0.4%, and 0.5%, respectively, are selected to be added to the asphalt concrete. Measurements indicate that the optimal addition ratio of 3 mm basalt fiber reinforcement bars for dense-graded asphalt concrete is 0.3% to 0.4%. Furthermore, the strain energy density of the asphalt concrete with added basalt fiber reinforcement bars can be increased by up to 49.5% compared to the dense-graded asphalt concrete without added reinforcement under −20° C. testing conditions. The measurements demonstrate that, adding basalt fiber reinforcement bars to dense-graded asphalt concrete can not only enhance its fracture energy but also improve its resistance to cracking, under the low-temperature test environment below 0° C.

In the present invention, the performance of toughness strength for solidified basalt fiber reinforced asphalt concrete is evaluated using relevant tests such as indirect tension test (IDT) and indirect tension cracking test (IDEAL-CT) for cracking resistance.

Indirect Tensile Test (IDT)

Given that traditional dynamic fatigue tests are time-consuming and require a significant amount of specimen material, there is a need for a testing method in field inspections that offers both high accuracy and efficiency, along with reliability. The IDT test for evaluating indirect tensile strength, conducted in accordance with ASTM D6931 (2017) standard, is incorporated into the Marshall mix design process, to assess the likelihood of tension-induced cracking in asphalt mixtures, where higher tensile strength indicates better resistance to fatigue cracking. Therefore, the IDT test can be regarded as one of the indicators for evaluating fatigue resistance. In comparison to cylindrical specimens used in dynamic tests, the Marshall specimens for IDT testing are smaller in size, which not only reduces material consumption but also significantly shortens the testing duration. Dynamic tests require repeated loading until the specimen fails due to fatigue, whereas in the IDT test, the specimen is loaded at a fixed rate until it fails. This makes it more suitable for on-site preliminary evaluation of material properties.

Indirect Tensile Asphalt Cracking Test (IDEAL-CT)

The IDEAL-CT test is a method based on fracture mechanics theory that determines the cracking tolerance index (CT Index) from the test, which is used to determine the cracking resistance of asphalt mixtures. A higher CT Index indicates better resistance to cracking, which signifies better toughness in the asphalt concrete.

In general, the CT Index is sensitive to factors like recycled asphalt pavement (RAP), recycled asphalt shingles (RAS), asphalt type, asphalt content, and aging conditions, and also correlates well with fatigue cracking, reflective cracking, and thermal cracking failures on the field pavement. Typically, only 3 IDEAL-CT laboratory specimens or on-site drill core specimens are required to obtain a coefficient of variation of 20% or less.

The implementation of IDEAL-CT is similar to traditional indirect tensile test. It primarily uses an indirect tensile loading frame and conducts the test at a room temperature of 25° C. with a loading rate of 50 mm/min. It prefers to use specimen a specimen with a diameter of 150 mm and a height of 62 mm.

IDEAL-CT determines the relationship curve between shear force and displacement at 25° C., and after calculation, it yields the cracking tolerance index (CT Index). In recent years, it has been used to evaluate the fatigue resistance and tensile cracking resistance for asphalt concrete. A higher CT Index indicates better resistance to cracking and slower crack propagation. Therefore, IDEAL-CT serves as an indicator for fatigue failure.

FIG. 1 is a graph illustrating the relationship between the porosity and the CT Index of the basalt fiber reinforced asphalt concrete according to the present invention. The test was conducted at 25° C. to determine the relationship between shear force and displacement, and a CT Index is calculated and obtained according to the formula. The influence of porosity on CT Index in asphalt concrete reinforced by basalt fiber is shown in FIG. 1. Regardless of the porosity, the CT Index is much higher than the specified value of 31. The highest value of CT Index in FIG. 1 can reach up to 4,900, while the lowest value is still above 198. Both the control group and the dry-mixed basalt fiber show a positive correlation. When the porosity is higher, it indicates less degrees of compaction and lower maximum theoretical specific gravity. During the test, the specimen will be re-compact, and the amount of deformation of the curve will be increased correspondingly, which leads to the increase of the displacement (l75) of 75% of the peak load after the peak, and the decrease of the slope (m75) of 75% of the peak load after the peak, resulting in an improvement in CT Index. However, wet mixing and cellulose fiber show a negative correlation, and their value range is lower compared to dry-mixed basalt fiber.

CT Index is influenced by many parameters, such as specimen height, specimen diameter, displacement (l75) of 75% of the peak load after the peak, slope (m75) of 75% of the peak load after the peak, and fracture energy (Gf). Among them, specimen height and diameter are made according to requirements, and their values do not affect the CT index that much. The value with the largest difference is m75, and the difference of its value range is nearly 3 times. When m75 is smaller, the curvature is smoother. It means when cracks appear in the AC, the cracks are less likely to be extended, which can be regarded as a good resistance to crack expansion, signifying better crack resistance. The relationship between CT Index and m75 shows a negative correlation. When distinguished by fiber type or mixing method, the determination coefficient is further improved. Among them, the fitting of dry mixing is closest to the real situation, while the m75 of wet mixing and cellulose fiber are higher than the control group.

Figure 2:
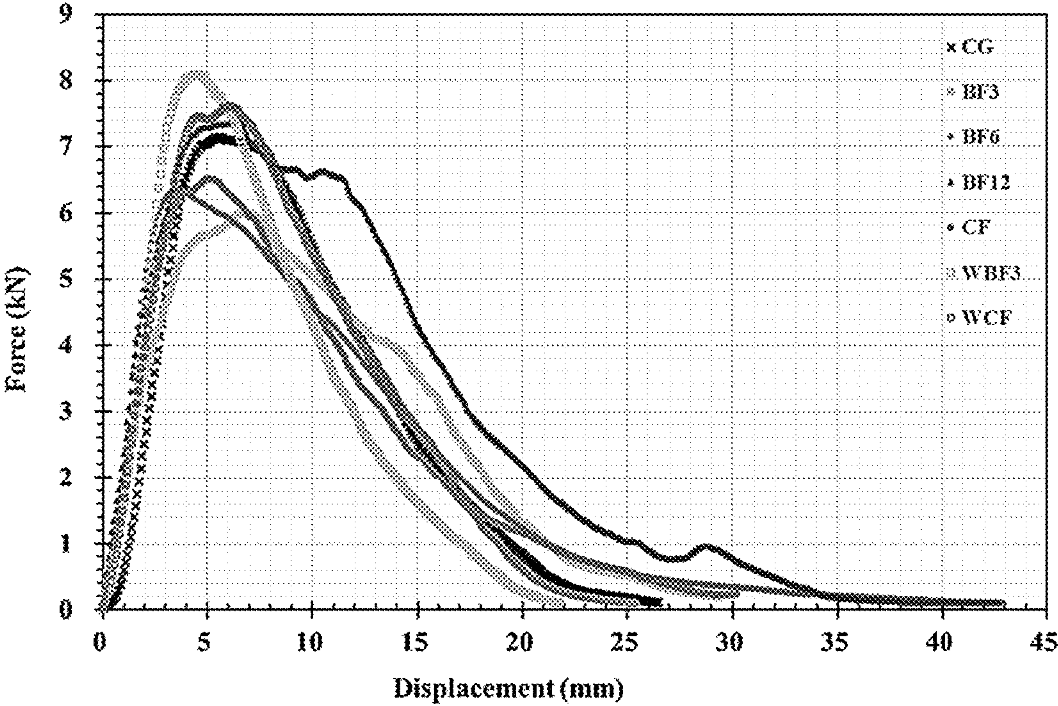
FIG. 2 is a graph illustrating the relationship between load and displacement in the IDEAL-CT test of the basalt fiber reinforced asphalt concrete in the present invention.

FIG. 2 is a graph illustrating the relationship between load and displacement in the IDEAL-CT test of the basalt fiber reinforced asphalt concrete in the present invention. The overlapped comparison of the IDEAL-CT load-displacement curves for various fiber-reinforced stone matrix asphalt (SMA) in the present invention is shown in FIG. 2. It can be observed that the load of the wet-mixed fiber-reinforced SMA (WBF3, WCF) is higher than the control group, the deformation is lower than the control group, and the curve after the peak is steeper. In contrast, the dry-mixed fiber-reinforced SMA exhibits the opposite trend. It may be due to the higher oil binder content (OBC) in dry mixing as compared to wet mixing, and the higher design binder content in dry mixing, which effectively slows down the crack propagation speed.

In addition, indirect tensile strength (ITS) is the ability to resist tensile cracking measured through the IDT test, with higher ITS values indicating better resistance to cracking. Therefore, ITS serves as an indicator of fatigue resistance. The ITS at 25° C. was tested in the present invention in order to understand the relationship between porosity and ITS in SMA. Generally the trend of ITS decreases as the porosity increases. It reflects the higher the porosity indicates poorer compaction of the specimen, and effective interlocking between the mixture reduces, and the concentration of loads increase accordingly. However, specimens from wet mixing (WBF3, WCF) show an increasing trend, which may be attributed to the interlocking effect between the aggregates.

Figure 3:
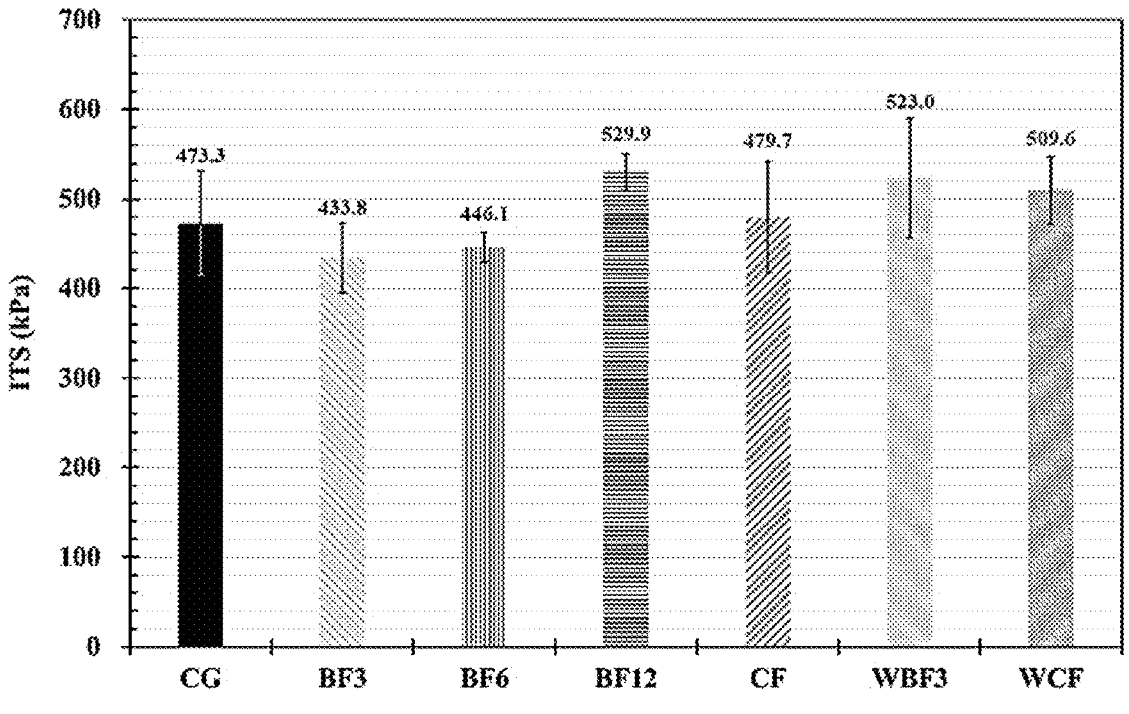
FIG. 3 is a graph illustrating the results of the IDT test for the basalt fiber reinforced asphalt concrete in various groups in the present invention.

FIG. 3 is a graph illustrating the results of the IDT test for the basalt fiber reinforced asphalt concrete in various groups in the present invention. FIG. 3 shows the IDT results at 25° C. with a porosity of 7±0.5% for fiber-reinforced stone matrix asphalt (SMA). The dry-mixed fiber-reinforced asphalt concrete with 3 mm and 6 mm basalt fibers leads to a slight decrease in ITS compared to the control group, probably due to the higher oil binder content (OBC) in the dry mixing process than that of the control group. However, the ITS for dry mixing with 12 mm basalt fibers (BF12) shows an improvement, probably because the restraint of the asphalt by 12 mm basalt fibers is more significant as compared to 3 mm and 6 mm fibers. In wet mixing, the specimens (WBF3, WCF) show an increase in ITS. It may be attributed to that fact both specimens have relatively less OBC, and in addition, in wet mixing, fiber-reinforced asphalt binder is added at the initial mixing stage, while in dry mixing, the fiber is added later in the process. Therefore, the basalt fibers in wet mixing have more time to adhere to the aggregates than those of dry mixing and may have a better bonding effect.

To sum up, as shown in FIG. 3, the various groups of asphalt concrete reinforced by basalt fibers, from CG group, BF3 group, BF6 group, BF12 group, CF group, WBF2 group to WCF group, have ITS values of 473.3, 433.8, 446.3, 529.9, 479.7, 523.0 to 509.6-kPa, respectively. Therefore, it is concluded that the asphalt concrete reinforced by basalt fibers has an indirect tensile strength of at least 433.8 kPa.

In the present invention, after conducting the IDT and IDEAL-CT tests for the hardened basalt fiber reinforced asphalt concrete to evaluate crack resistance, it is obtained that the hardened basalt fiber reinforced asphalt concrete has an IDT value greater than 433.8 kPa, with the highest CTIndex value of 4,900 in the IDEAL-CT test. This indicates the hardened basalt fiber reinforced asphalt concrete has excellent tensile strength and exceptional toughness.

Asphalt Binder Material Properties Test

First, basic tests on the material properties of asphalt mastic for penetration, softening point, viscosity, and specific gravity of asphalt are conducted. It was observed that when fibers are added into modified asphalt, the penetration value decreased overall. When 0.3% fibers by volume are added, the penetration value is at its lowest, indicating that the fiber-modified asphalt is much harder. When fibers are added into modified asphalt, the softening point increased overall, which can reduce the temperature sensitivity of the asphalt. When 0.3% fibers by volume are added, the softening point reached its highest value, indicating effective prevention of vertical flow. Viscosity significantly increases at low temperatures, and shows a significant improvement at 60° C. for fiber-modified asphalt with 0.2% fibers by volume. At high temperatures, the viscosity of the other fiber-modified asphalts is slightly higher than that of the original modified asphalt, except for fiber-modified asphalt with 0.2% fibers by volume.

Based on the considerations of penetration, softening point, and high and low-temperature viscosity, 0.3% volume fraction of fiber-modified asphalt is preferably the optimal additive amount. Considering the above results of softening point, penetration, and viscosity, 0.3% fibers by volume is preferably selected for analysis. For the sake of easy comparison, a 0.3% fiber content was used for all designs, regardless of fiber length. It is found that the fibers would absorb some of the asphalt, causing a decrease in the specific gravity of the modified asphalt after the fibers were added. In terms of basalt fiber properties and design ratios, the Marshall mix design method is used as the basis. Three types of mixtures are considered as follows: asphalt concrete without fibers, asphalt concrete with 3 mm basalt fibers, and asphalt concrete with 6 mm basalt fibers. These mixtures are combined with asphalt contents of 5.5%, 6%, 6.5%, 7%, and 7.5%, and precisely blended with other compositions according to the design curves of natural aggregate gradations. The stability values, flow values, void ratios, voids in mineral aggregate (VMA), and voids filled with asphalt (VFA) for each asphalt is first determined to calculate the optimal asphalt content (OAC), and then stability and flow values under the optimal asphalt content is estimated accordingly.

In the present invention, Superpave IDT tests are conducted with 0%, 0.3%, 0.5%, and 0.7% fibers by volume as basalt fiber additions for calculation and analysis. The thickness and maximum load of the specimen at 10° C. are averaged, and then the displacement readings taken at the maximum load are normalized. The test results show that the DCSEf value gradually increases from 0.3% to 0.7%, and the asphalt concrete with 0.7% basalt fiber content exhibits the best tensile strength. Similarly, for the IDEAL-CT test are conducted with 0%, 0.3%, 0.5%, and 0.7% fibers by volume as basalt fiber additions for calculation and analysis. The IDEAL-CT value is represented by CTindex, where a higher CTindex indicates better tensile strength. The results indicate that asphalt concrete with 0.5% basalt fiber content exhibits the optimal tensile strength.

The present invention provides using corrosion-resistant basalt fiber reinforcement bars to add into asphalt concrete materials as a strengthening material, which can enhance the engineering mechanical properties and toughness design performance for the reinforced asphalt concrete structure. It can also further improve the performance of the reinforced asphalt concrete structure, especially in terms of crack resistance, seismic resistance, impact resistance, and durability.

The basalt fiber reinforced asphalt concrete material provided in the present invention can be applied to areas requiring impact resistance, such as bus lanes, expansion joints, sidewalks, heavy traffic areas, building floors, etc. It can also be applied for non-structural cement concrete products, including precast cement floor tiles, interlocking bricks, permeable bricks, curbstones, etc., to enhance their durability.

In the present invention, due to the addition of basalt fiber reinforcement, the basalt fiber reinforced asphalt concrete can provide restraint force, which can increase the structural load-bearing capacity, reduce crack width, improve the efficiency of both longitudinal and transverse stress transfer, and extend the overall pavement life cycle of the road surface.

Figure 4:
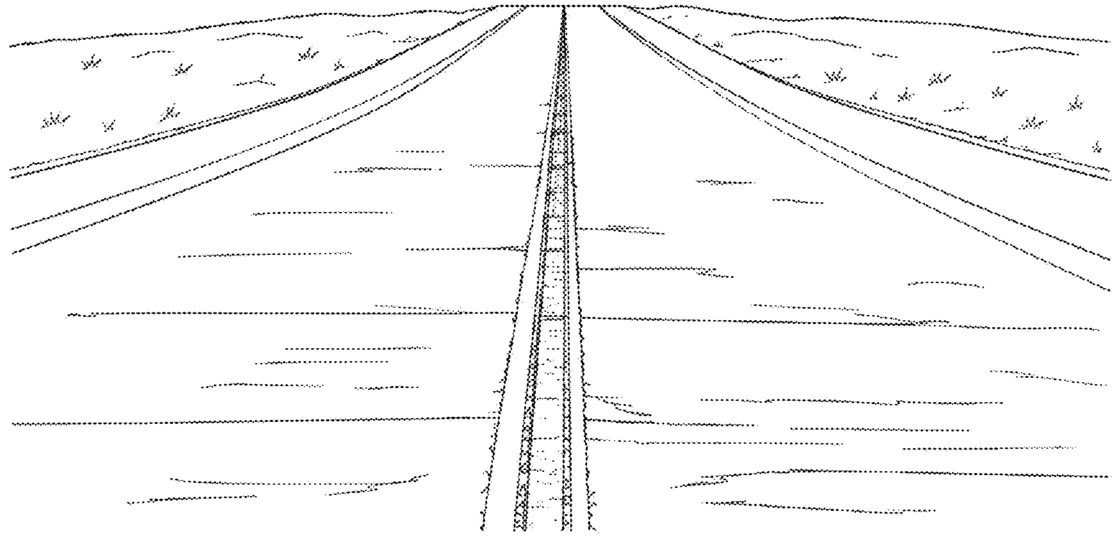
FIG. 4 is an image demonstrating the surface crack development for the ordinary asphalt concrete flexible road pavement without the addition of basalt fiber reinforcement.
Figure 5:
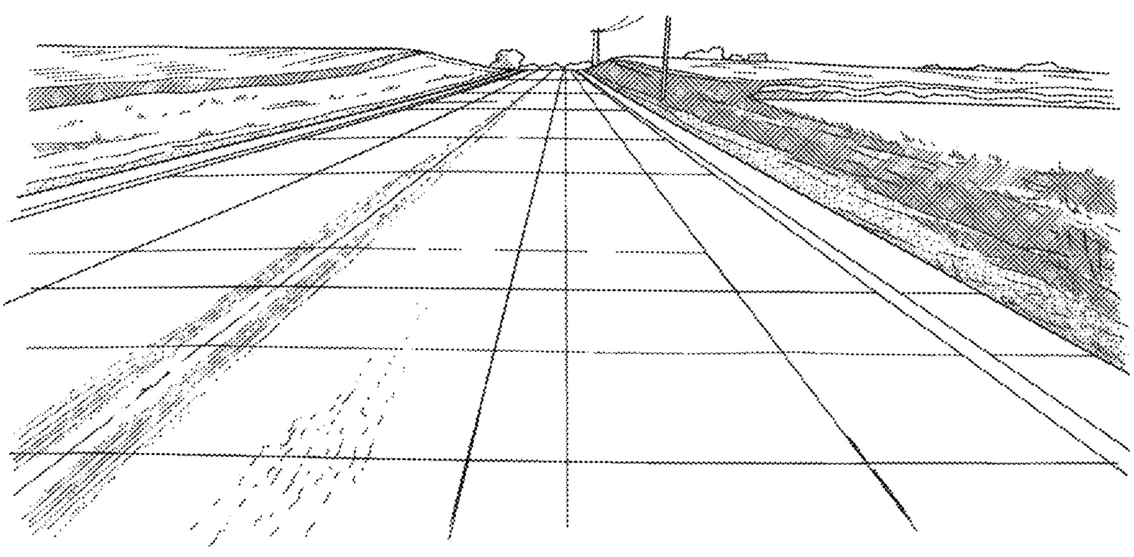
FIG. 5 is an image demonstrating the surface crack development for the basalt fiber reinforced asphalt concrete disclosed in the present invention used as a flexible road pavement.

FIG. 4 is an image demonstrating the surface crack development for the ordinary asphalt concrete flexible road pavement without the addition of basalt fiber reinforcement. FIG. 5 is an image demonstrating the surface crack development for the basalt fiber reinforced asphalt concrete disclosed in the present invention used as a flexible road pavement. As shown in FIG. 4, in an ordinary asphalt concrete flexible road pavement after many years of use, numerous "block-shaped" reflective cracks can be observed, along with fatigue cracks in the transverse direction and rutting deformations in the longitudinal direction of the wheel tracks. Although asphalt sealants have been used to fill the cracks, the condition of the flexible pavement is yet unsatisfactory.

By comparing FIG. 4 and FIG. 5, it is observed that the crack width control in FIG. 5, where basalt fiber reinforced asphalt concrete is used as the flexible road pavement, is more ideal. Even after many years of use and traffic wear, the condition of the flexible pavement remains quite favorable, and the longitudinal grooving texture on the surface is still quite clear. Under the same traffic conditions, the pavement made with basalt fiber reinforced asphalt concrete clearly shows smaller crack widths, which is due to the improved toughness of the flexible road surface. In other words, higher toughness results in fewer and smaller cracks. In addition, under higher restrain forces, the pavement made with basalt fiber reinforced asphalt concrete can effectively extend the overall life of the pavement, even when exposed to extreme weather and high temperatures.

There are further embodiments provided as follows.

Embodiment S1: A basalt fiber reinforced asphalt concrete includes: an asphalt material with a penetration grade between 40-300 at room temperature, selected from one of an asphalt mortar, an oil-soluble asphalt, an emulsified asphalt, and a modified asphalt; an aggregate having a first volume percentage between 50-80%; a basalt fiber reinforcement with a second volume percentage between 0.1-0.9%; and a chemical admixture for asphalt concrete used to adjust the properties of the basalt fiber reinforced asphalt concrete.

Embodiment S2: The basalt fiber reinforced asphalt concrete as described in Embodiment S1, the asphalt material has the penetration grade, a viscosity, a type, and a grade prepared in accordance with requirements from AASHTO, ASTM, or CNS.

Embodiment S3: The basalt fiber reinforced asphalt concrete as described in Embodiment S1, the first volume percentage is calculated according to one of the Marshall Method, Hveem Method, Hubbard-Field Method, and Smith Triaxial Method.

Embodiment S4: The basalt fiber reinforced asphalt concrete as described in Embodiment S2, the penetration grade is 60/70, 60/80, 80/100, or 85/100, and the viscosity is AC10, AC20, AR-8000, C170, or C320.

Embodiment S5: The basalt fiber reinforced asphalt concrete as described in Embodiment S1, the basalt fiber reinforced asphalt concrete is one of a dense-graded asphalt concrete, a porous asphalt concrete, a stone matrix asphalt concrete, a cast-in-place asphalt concrete, and a recycled asphalt concrete.

Embodiment S6: The basalt fiber reinforced asphalt concrete as described in Embodiment S1, the second volume percentage is selected from one of 0.1%, 0.2%, 0.3%, 0.4%, 0.5%, 1.0%, 1.5%, 2.0%, 3.0%, and 4.0%.

Embodiment S7: The basalt fiber reinforced asphalt concrete as described in Embodiment S1, the chemical admixture for asphalt concrete is selected from a superplasticizer, an air-entraining agent, a water reducer, a rapid setting agent, a retarding agent, an early strength agent, a water-reducing retarding agent, a water-reducing early strength agent, a high-performance water reducer, a high-performance water-reducing retarding agent, a plasticizer, a plasticizing and retarding agent, a pigment, a corrosion inhibitor, a shrinkage reducer, a freeze-thaw resistant agent, a pumping aid, a flowability concrete admixture, a special purpose admixture, and a combination thereof, and the basalt fiber reinforcement includes a basalt fiber, an unsaturated polyester, an epoxy, a vinyl resin, a filler, a curing agent, or a combination thereof.

Embodiment S8: The basalt fiber reinforced asphalt concrete as described in Embodiment S1, the basalt fiber reinforcement is produced by combining basalt fibers as the main material with polymer materials, and then performing an extrusion molding process.

Embodiment S9: The basalt fiber reinforced asphalt concrete as described in Embodiment S1, the basalt fiber reinforcement has a length in range between 1-12 mm.

Embodiment S10: The basalt fiber reinforced asphalt concrete as described in Embodiment S1, the basalt fiber reinforced asphalt concrete has an indirect tensile strength greater than 433.8 kPa exhibiting superior toughness, and a maximum CTindex value of 4,900 in the IDEAL-CT test.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A basalt fiber reinforced asphalt concrete, comprising:

an asphalt material with a penetration grade between 40-300 at room temperature, selected from one of an asphalt mortar, an oil-soluble asphalt, an emulsified asphalt, and a modified asphalt;

an aggregate having a first volume percentage between 50-80%;

a basalt fiber reinforcement having a length between 3-6 mm and a second volume percentage between 0.5% and 0.9% and configured to provide a restraint force to the basalt fiber reinforced asphalt concrete for reducing crack width and restraining crack propagation; and a chemical admixture for asphalt concrete used to adjust the properties of the basalt fiber reinforced asphalt concrete, wherein the basalt fiber reinforced asphalt concrete has a CT Index value between 1,000 and 3,850 in an IDEAL-CT test.

2. The basalt fiber reinforced asphalt concrete according to claim 1, wherein the first volume percentage is calculated according to one of the Marshall Method, Hveem Method, Hubbard-Field Method, and Smith Triaxial Method.

3. The basalt fiber reinforced asphalt concrete according to claim 1, wherein the penetration grade is 60/70, 60/80, 80/100, or 85/100, and the viscosity is AC10, AC20, AR-8000, C170, or C320.

4. The basalt fiber reinforced asphalt concrete according to claim 1, wherein the basalt fiber reinforced asphalt concrete is one of a dense-graded asphalt concrete, a porous asphalt concrete, a stone matrix asphalt concrete, a cast-in-place asphalt concrete, and a recycled asphalt concrete.

5. The basalt fiber reinforced asphalt concrete according to claim 1, wherein the chemical admixture for asphalt concrete is selected from a superplasticizer, an air-entraining agent, a water reducer, a rapid setting agent, a retarding agent, an early strength agent, a water-reducing retarding agent, a water-reducing early strength agent, a high-performance water reducer, a high-performance water-reducing retarding agent, a plasticizer, a plasticizing and retarding agent, a pigment, a corrosion inhibitor, a shrinkage reducer, a freeze-thaw resistant agent, a pumping aid, a flowability concrete admixture, a special purpose admixture, and a combination thereof, and the basalt fiber reinforcement comprises a basalt fiber, an unsaturated polyester, an epoxy, a vinyl resin, a filler, a curing agent, or a combination thereof.

6. The basalt fiber reinforced asphalt concrete according to claim 1, wherein the basalt fiber reinforced asphalt concrete has an indirect tensile strength greater than 433.8 kPa.

* * * * *